(12) United States Patent
Wakuta et al.

(10) Patent No.: US 7,255,186 B2
(45) Date of Patent: Aug. 14, 2007

(54) HYBRID DRIVE SYSTEM AND VEHICLE EQUIPPED THEREWITH

(75) Inventors: Satoru Wakuta, Anjo (JP); Kenji Omote, Anjo (JP); Takeshi Inuzuka, Anjo (JP); Kazuhisa Ozaki, Anjo (JP); Kazumasa Tsukamoto, Anjo (JP); Kozo Yamaguchi, Anjo (JP); Masatoshi Adachi, Toyota (JP); Kazutoshi Motoike, Toyota (JP); Masahiro Kojima, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 57 days.

(21) Appl. No.: 10/629,743

(22) Filed: Jul. 30, 2003

(65) Prior Publication Data

US 2004/0084233 A1   May 6, 2004

(30) Foreign Application Priority Data

Aug. 2, 2002   (JP) .............................. 2002-226765

(51) Int. Cl.
*B60K 1/02* (2006.01)

(52) U.S. Cl. .................. 180/65.2; 180/65.3; 475/5; 477/3; 477/5

(58) Field of Classification Search ............... 180/65.2, 180/65.3; 477/3, 5; 475/5
See application file for complete search history.

(56) References Cited

U.S. PATENT DOCUMENTS

| | | | |
|---|---|---|---|
| 3,623,568 A | 11/1971 | Mori | |
| 5,558,595 A | 9/1996 | Schmidt et al. | |
| 5,842,534 A * | 12/1998 | Frank | 180/65.2 |
| 5,895,333 A * | 4/1999 | Morisawa et al. | 475/5 |
| 5,904,631 A | 5/1999 | Morisawa et al. | |
| 6,146,302 A * | 11/2000 | Kashiwase | 475/5 |
| 6,155,364 A | 12/2000 | Nagano et al. | |
| 6,203,468 B1 * | 3/2001 | Nitta et al. | 477/5 |
| 6,371,878 B1 | 4/2002 | Bowen | |
| 6,478,705 B1 | 11/2002 | Holmes et al. | |
| 6,516,253 B2 | 2/2003 | Boggs et al. | |
| 6,554,736 B2 * | 4/2003 | Takano et al. | 477/5 |
| 6,558,283 B1 | 5/2003 | Schnelle | |
| 6,558,287 B2 * | 5/2003 | Hayabuchi et al. | 475/271 |
| 6,600,980 B1 * | 7/2003 | Kraska et al. | 701/22 |
| 6,740,002 B1 * | 5/2004 | Stridsberg | 477/14 |
| 6,752,738 B1 * | 6/2004 | Martin et al. | 475/276 |

(Continued)

FOREIGN PATENT DOCUMENTS

CN   1336879 A   2/2002

(Continued)

*Primary Examiner*—Christopher P. Ellis
*Assistant Examiner*—John Walters
(74) *Attorney, Agent, or Firm*—Oliff & Berridge, PLC

(57) ABSTRACT

An output of an internal combustion engine is transmitted to an output shaft by controlling a control motor to change a rotation speed output from the engine without speed steps via power distribution planetary gear. An output of a drive motor is input to the output shaft by changing the speed into two-step decelerated rotation by means of an automatic transmission. The transmission produces a desired torque by decelerating the speed by a large degree when a vehicle speed is low, and produces a desired number of revolutions by decelerating the speed by a small degree when the vehicle speed is high.

43 Claims, 9 Drawing Sheets

U.S. PATENT DOCUMENTS

| | | |
|---|---|---|
| 6,886,648 B1 | 5/2005 | Hata et al. |
| 6,907,325 B1 * | 6/2005 | Syed et al. .................... 701/22 |
| 2002/0094898 A1 | 7/2002 | Hata et al. |
| 2003/0078134 A1 | 4/2003 | Kojima et al. |
| 2003/0178953 A1 | 9/2003 | Turnback et al. |
| 2003/0218447 A1 * | 11/2003 | Coates et al. ............... 320/134 |
| 2004/0103719 A1 * | 6/2004 | Raftari et al. .............. 73/118.1 |
| 2004/0254045 A1 * | 12/2004 | McGee et al. ................. 477/3 |

FOREIGN PATENT DOCUMENTS

| | | |
|---|---|---|
| DE | 198 03 160 C 1 | 1/1998 |
| DE | 198 03 160 C1 | 1/1998 |
| DE | 199 03936 A1 | 5/2000 |
| DE | 201 17 410 U 1 | 1/2002 |
| EP | 1 114 744 A2 | 7/2001 |
| EP | 1 223 067 A2 | 7/2002 |
| EP | 1 304 248 A1 | 2/2003 |
| JP | 47-31773 | 8/1972 |
| JP | S50-30223 | 3/1975 |
| JP | A 07-96759 | 4/1995 |
| JP | A 8-183347 | 7/1996 |
| JP | A 09-226392 | 9/1997 |
| JP | A 10-341503 | 12/1998 |
| JP | A 2000-2327 | 1/2000 |
| JP | A-2000-245013 | 9/2000 |
| JP | 2000-346187 | 12/2000 |
| JP | A 2001-231107 | 8/2001 |
| JP | 2002-1807 | 4/2002 |
| JP | A 2002-225578 | 8/2002 |
| JP | 2003-127681 | 5/2003 |
| WO | WO 02/47931 A1 | 6/2002 |

* cited by examiner

● FOR EXAMPLE WHEN THE BEST FUEL CONSUMPTION CURVE IS FOLLOWED....
●—·—● ENTIRE SPEED CHANGE (LO)
●———● ENTIRE SPEED CHANGE (HI)
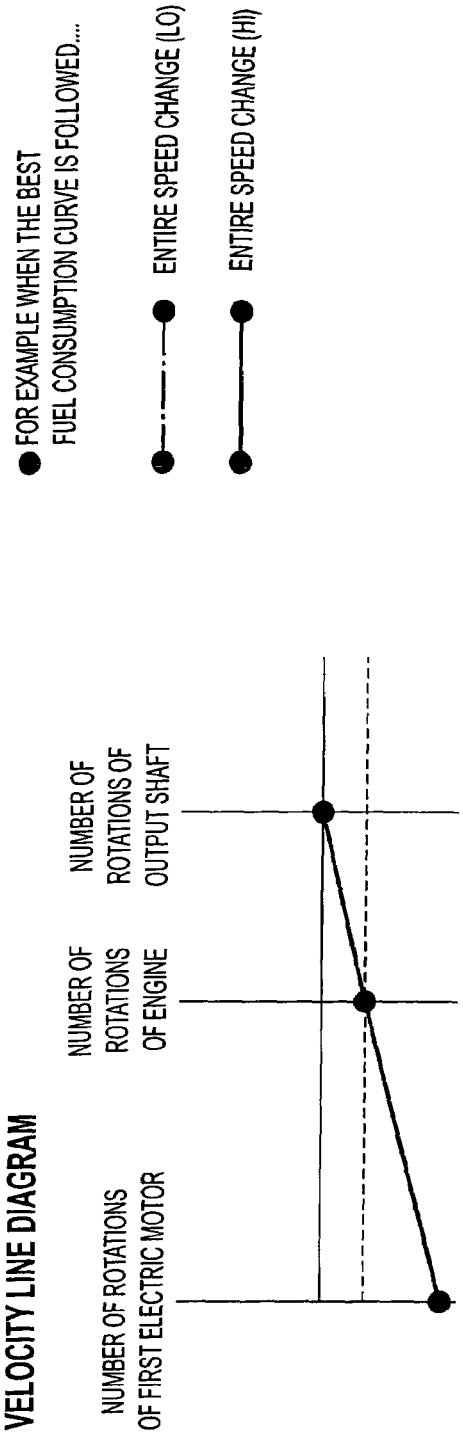
FIG. 6A  VELOCITY LINE DIAGRAM
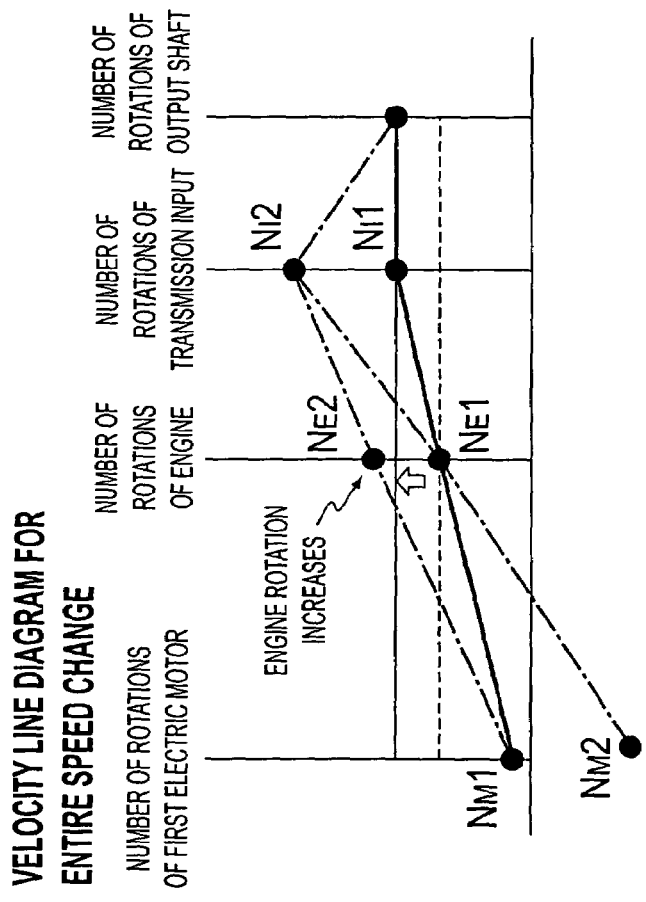
FIG. 6B  VELOCITY LINE DIAGRAM FOR ENTIRE SPEED CHANGE

HYBRID DRIVE SYSTEM AND VEHICLE EQUIPPED THEREWITH

INCORPORATION BY REFERENCE

The disclosure of Japanese Patent Application No. 2002-226765 filed on Aug. 2, 2002 including the specification, drawings and abstract are incorporated herein by reference in its entirety.

BACKGROUND OF THE INVENTION

1. Field of Invention

This invention relates to a hybrid drive system incorporated in a vehicle and a vehicle equipped with the hybrid drive system, and more specifically, to an output structure from a drive (assist) electric motor.

2. Description of Related Art

Conventionally, a hybrid drive system of a so-called mechanical distributing type (a distribution type or a two motor type) has been provided in a vehicle (registered trademark name "PRIUS") for commercial practice, in which the engine output is distributed in a planetary gear to a control motor and to a traction output side, and the motor is controlled mainly as a generator for step-less control of the output torque of the planetary gear, and torque of another electrical motor for driving (assisting) is combined with the output torque of the planetary gear as required and then output to the output shaft.

The above hybrid drive system of mechanical distributing type includes a hybrid drive system for FF (front engine, front drive) as disclosed in, for example, Japanese Patent Laid-Open Publication No. Hei 8-183347. An FR-type hybrid drive system is also possible. An example of the FR-type hybrid drive system is shown in FIG. 9.

In a vehicle 1 equipped with the hybrid drive system, as shown in FIG. 9, an internal combustion engine 5, such as a gasoline engine or the like is provided. The longitudinal direction of the engine 5 is aligned with the crank shaft and the engine 5 is, in a portion generally between the front wheels 3, 3, in a front part of a vehicle body 2. Further, the above two-motor type hybrid drive system 6 is arranged adjacent to and behind the engine 5. The hybrid drive system 6 is generally aligned with the crank shaft in the axial direction and has a first motor (electric motor for control) 7, a power distribution planetary gear 9, and a second motor (electric motor for drive) 10 arranged in order from the engine side.

The above hybrid drive system 6 has an input shaft 12 connected via a damper 8 with an output shaft 5a which is provided with the rear protruding portion of the engine crank shaft. The first motor 7 is arranged coaxially with the input shaft 12 on the outer radial side of the input shaft. The first motor 7 is provided with an AC permanent magnet synchronous type (brushless DC motor), and has a stator 13 fixed on the case, and a rotor 15 which is rotatably supported on the inner radial side of the stator with a predetermined air gap being provided therebetween.

The above power distribution planetary gear 9 is provided with a simple planetary gear arranged coaxially with the input shaft 12, and has a carrier CR1 connected with the input shaft 12 and supporting a plurality of planetary pinions P1, a sun gear S1 connected with the rotor 15, and a ring gear R1 which serves as a traction output portion. The ring gear R1 is connected with an output shaft 16 extending backward on the same axis line as the input shaft 12.

The second motor 10 is provided with a similar brushless DC motor larger than the motor 7. The second motor 10 is arranged coaxially with and on the outer radial side of the output shaft 16, and has a stator 17 fixed to the case, and a rotor 19 rotatably supported on the inner radial side of the stator 17 with a predetermined air gap being provided therebetween.

The output shaft 16 protrudes from the case and further extends toward the rear of the vehicle where it is connected with a differential device 22 via a flexible connection 20 and a known propeller shaft 21 (actually, a universal joint, center bearing and the like are provided though they are omitted in the figure). Further, the rotation (drive) is transmitted from the differential device via the left and right drive shafts 23*l*, 23*r* to the rear wheels 25, 25.

In the FR-type vehicle 1 equipped with the hybrid drive system 6, the output of the engine 5 is transmitted to the carrier CR1 of the power distribution planetary gear 9 via the damper 8 and the input shaft 12. In the planetary gear 9, the above engine output is distributed and transmitted from the sun gear S1 to the first motor (motor for control) 7, and from the ring gear R1 to the shaft 16 for traction. At this point, the first motor 7 is controlled for step-less adjustment of the output torque and rotation which is input to the output axis 16, and then output therefrom. Furthermore, in a case where a large torque is required at a time of starting or other cases, the second motor (motor for drive) 10 is driven, then the motor torque of the second motor 10 assists the torque of the output shaft 16 and is transmitted to the propeller shaft 21. The motor torque is then further transmitted to the rear wheels 25 via the differential device 22 and the left and right drive shafts 23*l*, 23*r*.

Note that the second motor 10 uses electrical energy generated by the first motor 7, and, additionally, when the generated energy is insufficient for the required energy, it uses battery energy generated by the first motor 7 when functioning as a generator and stored in the battery. Furthermore, the second motor 10 functions as a regenerative generator when braking is applied.

SUMMARY OF THE INVENTION

Generally in the foregoing hybrid drive system, the first motor is controlled such that the power distribution planetary gear is kept to have a relatively high gear ratio (an overdrive state), and the engine is controlled so as to be in a state where the efficiency is high and the exhaust gas amount is small (so as to follow the optimum fuel consumption characteristics in general). When acceleration is required at a time of starting or in other cases, the hybrid drive system exclusively uses the output of the second motor (motor for drive) to deal with the requirement. Therefore, the hybrid drive system is capable of providing excellent effects in fuel consumption improvement, exhaust gas reduction and the like from the high energy efficiency. However, the size of the second motor (motor for drive) is determined by the vehicle weight, required acceleration performance, and the like.

Accordingly, when the hybrid drive system is applied to a vehicle that has a heavy vehicle weight and is then equipped with an engine of a large displacement amount with a requirement for a predetermined acceleration performance, the second motor (electric motor for drive) is increased in size. This may cause a problem in vehicle mountability, particularly, in mountability for an FR-type vehicle.

Accordingly, it is an object of the invention to provide a hybrid drive system and a vehicle equipped with the hybrid drive system which are capable of reducing the size of an electric motor and meeting a predetermined requirement of the vehicle by interposing a transmission between the electric motor for drive and an output portion in order to solve the foregoing problems.

A first aspect of the invention relates to a hybrid drive system in which the hybrid drive system transmits output from an internal combustion engine to an output portion and inputs output from a second (for drive) electric motor to the output portion. The hybrid drive system is characterized in that a first (for control) electric motor and a power distribution planetary gear are provided, the power distribution planetary gear has a first rotation element to which the output from the internal combustion engine is transmitted, a second rotation element operatively linked with the first electric motor, and a third rotation element which is operatively linked with the output portion (whereby, for example, the output of the internal combustion engine to which the first rotation element is input is changed in speed without speed steps, and is output to the third rotation element, by controlling the electric motor for control which is operatively operatively linked with the second element), and the transmission is interposed between the second electric motor and the output portion.

Note that the output portion above shows a general outline including not only the output shaft of the hybrid drive system but also a power train, such as a propeller shaft, which is operatively linked with the output shaft and executes power transmission to the drive wheels. Further, the transmission above is preferably interposed in a power transmission path (e.g. the output shaft) between the second electric motor and the output portion, such as the propeller shaft or the like.

Therefore in the first aspect of the invention, the output of a second electric motor is transmitted to an output portion after the speed of the output is changed via a transmission. Accordingly, the second electric motor outputs a large torque to the output shaft at the time of low rotation at the output portion, by shifting the transmission to low. At the time of high rotation, the second electric motor outputs a high number of revolutions, by shifting the transmission to high. Therefore, required torque and number of revolutions are secured without increasing the size of the second electric motor. Further, because the transmission is arranged between the second electric motor and the output portion, shifting of the transmission also exerts no influence on control of the internal combustion engine and of a device for changing the speed of the output of the internal combustion engine without speed steps and transmitting it to the output portion. Thus, it is possible to execute control easily for maintaining the internal combustion engine in a state where the efficiency is high, the fuel consumption is low, and exhaust gas amount is small, without requiring a complicated control.

Further, in a power distribution planetary gear and a first electric motor, the speed of the output of the internal combustion engine is changed without speed steps and output to the output portion. Accordingly, it is possible to change the rotation speed of the output shaft while maintaining the internal combustion engine in an appropriate state. Thus, any insufficiency of drive force is compensated by the second electric motor alone. Accordingly, it is possible to control the internal combustion engine with the best fuel consumption characteristics and the like by using a small device. At the same time, a hybrid drive system of a small size and having improved fuel consumption characteristics can be provided combined with a reduction in the size of the second electric motor.

The hybrid drive system according to the first aspect of the invention may be structured such that the transmission is an automatic transmission including a plurality of shift speeds with different power transmission paths. Therefore, in the first aspect of the invention, the transmission is provided with an automatic transmission with a plurality of speed steps. Accordingly, it is possible to switch the transmission in an appropriate state to provide an output of the electric motor for drive with a high efficiency.

The hybrid drive system according to the first aspect of the invention may be structured such that, the transmission is the automatic transmission which outputs a plurality of decelerated rotations provided by different reduction gear ratios. Therefore, in the first aspect of the invention, because the automatic transmission outputs a plurality of decelerated rotations, it is possible to achieve output characteristics appropriate for characteristics of an electric motor, particularly, of a brushless DC motor.

The hybrid drive system according to the first aspect of the invention may be structured such that the transmission has a planetary gear unit which is axially arranged. In the first aspect of the invention, because the transmission is provided with a planetary gear unit which is axially arranged, an appropriate gear ratio can be achieved with a compact structure.

The hybrid drive system according to the first aspect of the invention may be structured such that the planetary gear unit is of a Ravigneaux type. Therefore in the first aspect of the invention, because the planetary gear unit is of a Ravigneaux type the transmission can be decreased in size. At the same time, a desired gear ratio can be achieved easily by forming the long (common) pinion such that it has steps with different numbers of teeth.

In the first aspect of the invention, the hybrid drive system may be structured such that the transmission has at least two friction engagement elements, and the power transmission paths of the planetary gear unit are switched by selecting actuation of the friction engagement elements. Therefore in the first aspect of the invention, because the transmission has at least two fraction engagement elements selectively actuated, a desired gear ratio can be achieved easily, securely and quickly.

In the first aspect of the invention, the hybrid drive system may be structured such that the transmission is housed in cases, the friction engagement elements are a second brake and a first brake interposed between the two different elements of the planetary gear unit and the cases, and the brakes are arranged around the planetary gear unit on the outer radial side thereof. Therefore in the first aspect of the invention, the first and second brakes are arranged between a case so as to surround the planetary gear. Thus, the transmission can be structured so as to be reduced in size, particularly in size in the axial direction.

In the first aspect of the invention, the hybrid drive system may be structured such that the cases are a motor case housing the second electric motor and an extension housing, the transmission is housed inside a case space provided by joining a rear end face of the motor case and a front end face of the extension housing, and one of the first and second brakes is arranged in the motor case and the other of the first and second brakes is arranged in the extension housing. Therefore in the first aspect of the invention, the transmission is housed in a case space provided by joining a motor case and an extension housing, and the first and second brakes are respectively arranged in the motor case and the extension housing. Accordingly, each brake is attached to the motor case or the extension housing, and then they are joined so as to form an integrated case. Thus, the assembly is easily performed.

In the first aspect of the invention, the hybrid drive system may be structured such that an actuator (e.g. hydraulic actuator) for actuating the second or first brake is arranged in a support portion of the case. Therefore in the first aspect of the invention, an actuator for the brake is arranged at a supporting portion of the case. Accordingly, it is possible that the transmission is reasonably arranged in the case space, and thus the transmission can be compactly structured.

In the first aspect of the invention, the hybrid drive system may be structured such that the motor case has a partition wall which serves as the support portion on which a bearing is attached for supporting a rotor of the second electric motor, and the actuator (e.g. hydraulic actuator) is arranged on the partition wall, overlapping the bearing in the axial direction. Therefore in the first aspect of the invention, a bearing is attached to a partition wall for separating a motor housing portion and a transmission housing portion of the motor case from each other. Thus, the rotor of the electric motor is accurately supported. At the same time, the output portion extending from the third rotation element of the power distribution planetary gear can also be reliably supported with a high accuracy via the bearing. Further, the bearing above and the actuator are arranged on the partition wall so as to overlap in the axial direction. Therefore, extra space for the actuator is not required, and thus a compact structure is provided.

In the first aspect of the invention, the hybrid drive system may be structured such that the actuator is a hydraulic actuator, and the first brake, which is actuated by the hydraulic actuator arranged on the partition wall of the motor case, is structured so as to have a large torque capacity. Additionally, a hydraulic actuator may be arranged in the support portion of the extension housing and designed to have a double piston structure, and the second brake actuated by the hydraulic actuator is structured to have a small torque capacity as compared with the first brake. Therefore in the first aspect of the invention, if the first brake actuated by the hydraulic actuator compactly arranged has, for example, a large number of brake plates and a high torque capacity, a desired braking force can be secured even when a pressing force of the hydraulic actuator is small. On the other hand, if a hydraulic actuator is arranged in the extension housing with increased space, a double piston structure can be used to obtain a large pressing force. In such a case, a desired braking force can be secured even if, for example, a small-sized second brake having a small number of brake plates is used. Consequently, a reasonable layout that is well-balanced can be provided and, particularly for an FR-type which tapers to the rear part, a reasonable layout can be provided for the transmission, so that compact structure is provided.

In the first aspect of the invention, the hybrid drive system may be structured such that the planetary gear unit has a common carrier for supporting a long pinion and a short pinion, and the long pinion has a large-diameter gear and a small-diameter gear, and the short pinion is meshed with the small-diameter gear, the first sun gear and the first ring gear, and the large-diameter gear is meshed with a second sun gear, and the first sun gear is connected with the rotor of the electric motor, and the common carrier is connected with the output portion, and the first ring gear is connected with the second brake, and the second sun gear is connected with the first brake. Therefore in the first aspect of the invention, a planetary gear unit has a common carrier supporting a short pinion and a long pinion having a large-diameter gear and a small-diameter gear. Thus, a compact structure and a desired gear ratio can be provided.

In the first aspect of the invention, the hybrid drive system may be structured such that the first brake is arranged on the external diameter side of the second sun gear and the large-diameter gear. Therefore in the first aspect of the invention, the first brake is arranged on the external diameter side of the second sun gear and the large-diameter gear of the long pinion. Thus, the large-sized, large-torque-capacity first brake can be reasonably arranged in a space in which there is the ring gear. Accordingly, reduction in the entire size can be achieved.

A second aspect of the invention relates to a vehicle comprising an internal combustion engine, drive wheels, and the hybrid drive system according to the first aspect of the invention in which output from the output portion is transmitted to the drive wheels. Therefore in the second aspect of the invention, a vehicle with excellent fuel consumption characteristics with less exhaust gas amount is provided by mounting the aforementioned hybrid drive system on the vehicle.

A third aspect of the invention relates to a vehicle in which an internal combustion engine, drive wheels, and a hybrid drive system are provided, the hybrid drive system has a first (for control) electric motor, a power distribution planetary gear, a second (for drive) electric motor and a transmission, and in the power distribution planetary gear, output of the internal combustion engine is output to an output portion by controlling the first electric motor, and further, output of the second electric motor is input to the output portion by changing the speed so as to have a plurality of speed steps in the transmission, and the output portion is operatively linked with the output portion. Therefore in the third aspect of the invention, a hybrid drive system having a first electric motor, a power distribution planetary gear and a second electric motor provides excellent fuel consumption and exhaust gas characteristics in a compact structure. Additionally, the output of the second electric motor is transmitted to the output portion via the transmission. This makes it possible to reduce the size of the second electric motor, and to achieve further reduction in size. And also, it is possible to obtain power characteristics required for the vehicle, maintaining the internal combustion engine in the appropriate state. In addition, it is possible to easily and accurately control the internal combustion engine regardless of shifting of the transmission.

In the third aspect of the invention, the vehicle may be structured such that the internal combustion engine is arranged in a front part of a vehicle body such that its crank shaft is oriented in the longitudinal direction of the vehicle body, in a portion behind the internal combustion engine, the first electric motor, the power distribution planetary gear, the second electric motor, and the transmission are arranged axially and in the order from the internal combustion engine toward the rear part of the vehicle, and the drive wheels which are operatively linked with the output portion are rear wheels. Therefore in the third aspect of the invention, the hybrid drive system is axially arranged, and the transmission allows the second motor to be reduced in size. Combining both, the hybrid drive system can be applied to an FR-type vehicle. Thus, the aforementioned hybrid drive system which is excellent in fuel consumption and exhaust gas characteristics can be applied to a vehicle equipped with an internal combustion engine of a large displacement amount, and the other expansions of the scope of the application can also be planned.

BRIEF DESCRIPTION OF THE DRAWINGS

Hereafter, embodiments according to the invention will be described with reference to the accompanying drawings, in which:

FIGS. 6(a) and 6(b) are velocity line diagrams of a power distribution planetary gear, FIG. 6(a) for a conventional art vehicle, and FIG. 6(b) for a transmission that is arranged at a downstream side of an output shaft of the invention;

DETAILED DESCRIPTION OF PREFERRED EMBODIMENTS

Figure 1:
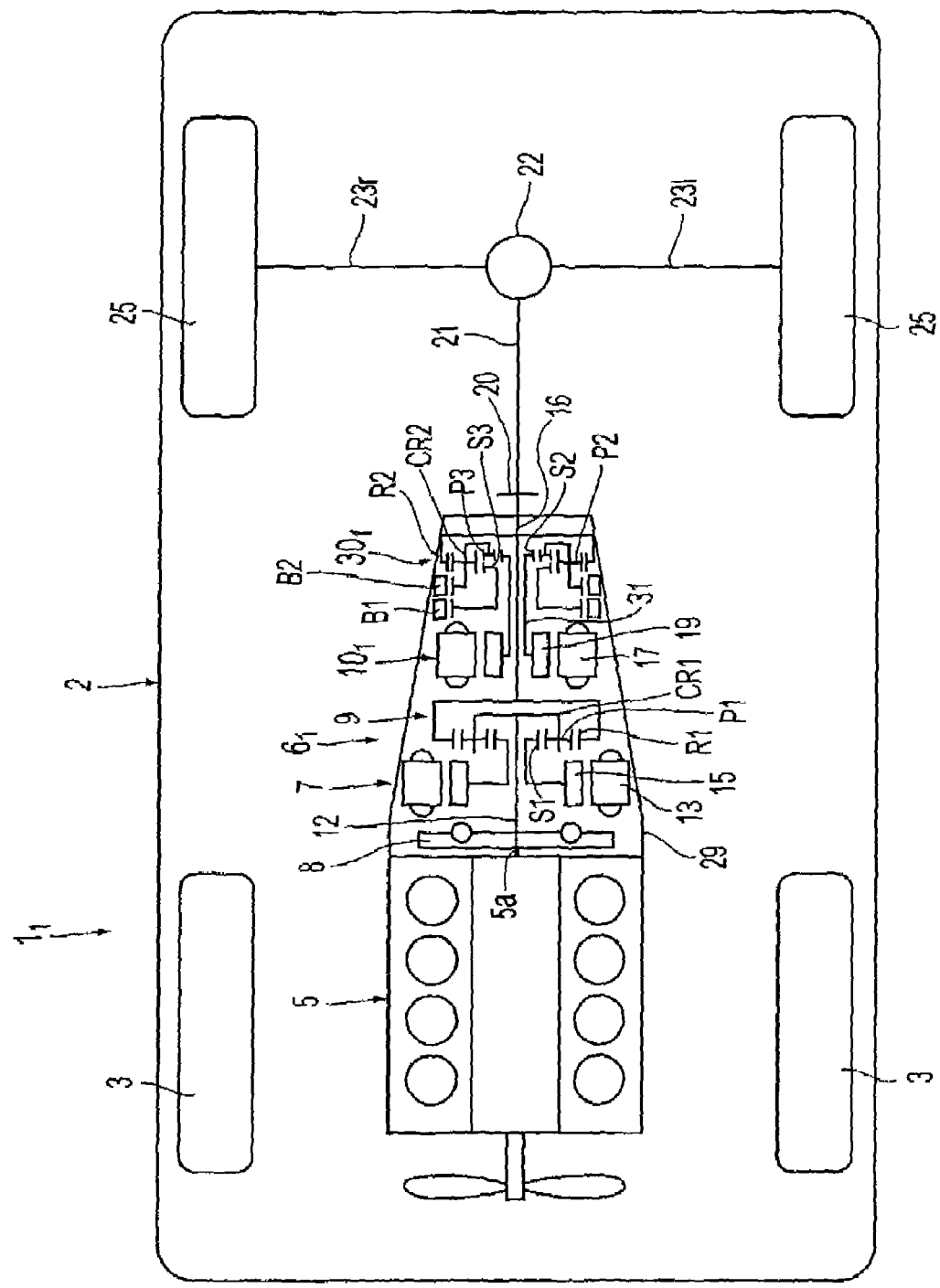
FIG. 1 is a plan view showing a first embodiment of the invention.

FIG. 1 is a plan view illustrating an outline of an FR-type vehicle equipped with a hybrid drive system (a first embodiment) according to the invention, in which reference numeral $1_1$ denotes the FR-type vehicle equipped with the hybrid drive system $6_1$. A vehicle body 2 of the vehicle $1_1$ is suspended to right and left front wheels 3, 3 and right and left rear wheels 25, 25. In the front part of the vehicle body 2 is an internal combustion engine 5 with the crank shaft that is oriented in the longitudinal direction and is mounted via a rubber mount.

As in the case of the foregoing, the hybrid drive system $6_1$ has a first motor (electric motor for control) 7, a power distribution planetary gear 9, and a second motor (electric motor for drive) $10_1$ which are axially arranged and aligned with the crank shaft, in order, from the engine 5 side. In addition, a transmission $30_1$, such as an automatic transmission or the like, is arranged behind the second motor $10_1$. The hybrid drive system $6_1$ is housed in a case 29 which is formed by integrally combining separate case portions. The combined case 29 is fixed to the engine 5 and has first and second motor housing portions for respectively housing the first and second electric motors 7, $10_1$, and housing portions for respectively housing the power distribution planetary gear 9 and the transmission $30_1$. Further, both motor housing portions are defined by partition walls, and also each of the rotor shafts is rotatably supported by the partition walls in a double support structure.

An input shaft 12 of the hybrid drive system $6_1$ is connected via a damper 8 to an output shaft 5a which is formed by a rear protruding portion of the crank shaft of the internal combustion engine 5. The first motor 7 is arranged coaxially with the input shaft 12 on the outer radial side thereof and coaxial with the crank shaft. The first motor 7 is provided with a brushless DC motor and has a stator 13 fixed to the combined case 29 and a rotor 15 rotatably supported on the inner radial side of the stator with a predetermined air gap. The power distribution planetary gear 9 is provided with a simple planetary gear arranged coaxially with the input shaft 12, and has a carrier (a first rotation element) CR1 connected with the input shaft 12 and supporting a plurality of planetary pinions P1, a sun gear (a second rotation element) S1 connected with the rotor 15, and a ring gear (a third rotation element) R1 which serves as a traction output portion. The ring gear R1 is connected with an output shaft (portion) 16 extending toward the rear of the vehicle $1_1$ along the axis of the input shaft 12.

The second motor $10_1$ is provided with a brushless DC motor and has a stator core 17 fixed to the combined case 29, and a rotor 19 rotatably supported on the inner radial side thereof with a predetermined air gap. The rotor 19 is fixed to a sleeve (intermediate) shaft 31 which covers the output shaft 16 so as to be relatively rotatable such that the sleeve shaft serves as an input shaft of the transmission $30_1$. Note that an output portion of the transmission $30_1$ is connected with the output shaft 16, and therefore the second motor $10_1$ is connected with the output shaft 16 via the transmission $30_1$.

The transmission $30_1$ is provided with one dual planetary gear and a planetary gear having a sun gear and a pinion which is common with the planetary gear, which are so called Ravigneaux-type planetary gear unit. A first sun gear S2 is provided on the sleeve shaft 31, a ring gear R2 is connected with the output shaft 16, a carrier CR2 supports dual pinions P2, P3 that respectively mesh with the sun gear S2 and the ring gear R2, and a second sun gear S3 meshing with the pinion P2 is provided with a long pinion which serves as a common pinion. Further, the carrier CR2 is connected with a second brake B2, and the second sun gear S3 is connected with a first brake B1. Thus, the transmission $30_1$ is switched to two deceleration speeds in steps of different reduction gear ratios.

Figure 9:
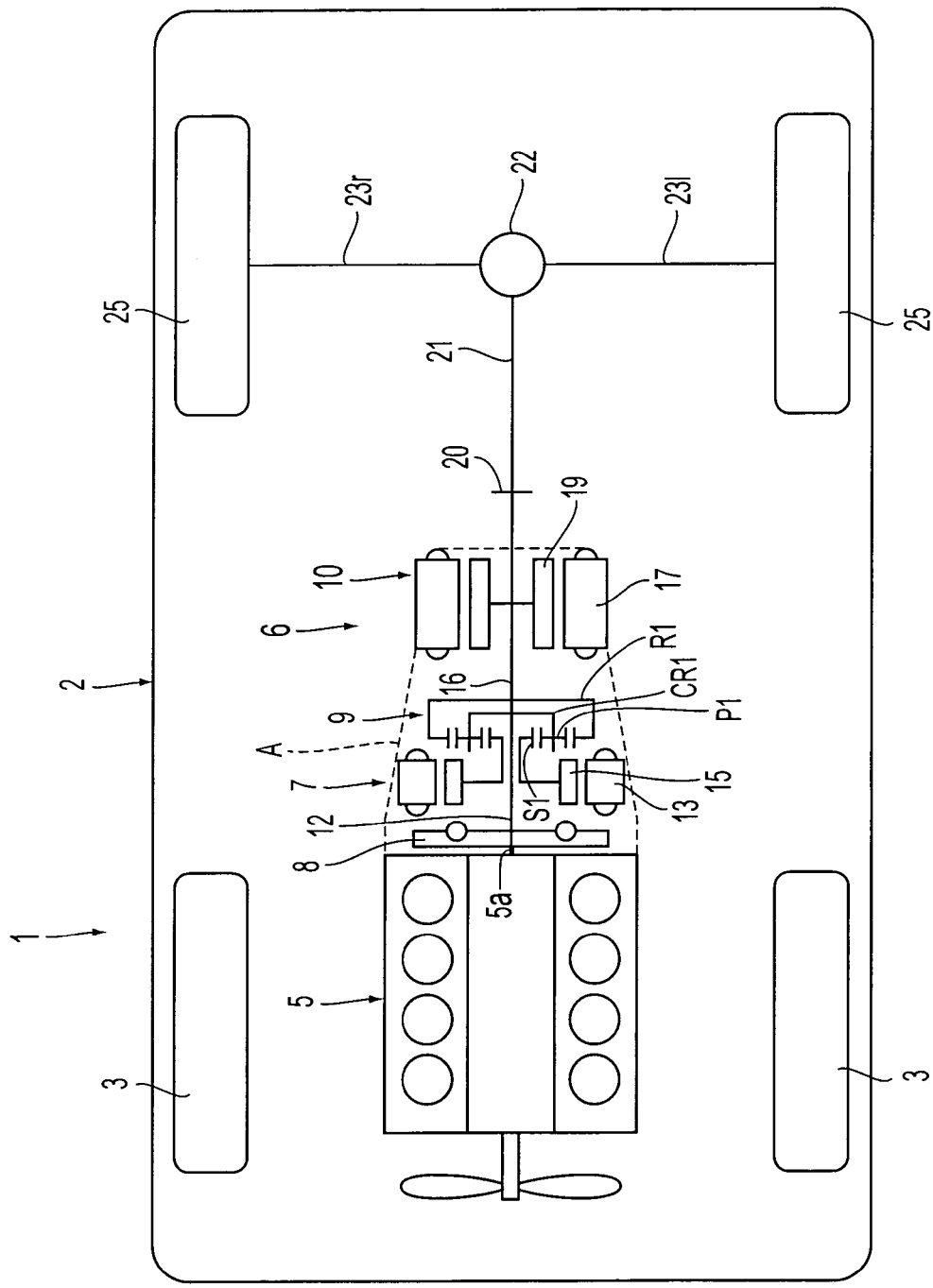
FIG. 9 is a plan view showing an example in which the hybrid drive system according to an art related to the invention is incorporated in an FR vehicle.

Note that as in the structure shown in FIG. 9, in FIG. 1 numeral 20 denotes a flexible connection, reference numeral 21 denotes a propeller shaft, and reference numeral 22 denotes a differential gear. The propeller shaft 21, and so on, are a power train for transmitting drive from the output shaft 16 to the drive wheels and constitute the output portion together with the output shaft 16. Further, the first motor (electric motor for control) 7 exclusively functions as a generator, and the amount of electric generation thereof is controlled such that the speed of the output from the internal combustion engine 5 is changed without speed steps at the power distribution planetary gear 9 for transmission to the output shaft 16. Further, the second motor (electric motor for drive) $10_1$ functions as a drive motor mainly to assist the driving force of the vehicle, but also functions as a generator at a time of braking so as to regenerate a vehicle inertial force as electric energy.

In the vehicle $1_1$ equipped with the hybrid drive system $6_1$, similarly, the output of the internal combustion engine 5 is transmitted to the power distribution planetary gear 9 via the damper 8 and the input shaft 12, and divided between the first motor (motor for control) 7 and the output shaft 16 by the planetary gear. Further, by controlling the first motor 7, step-less adjustment is executed to the rotation to be output from the output shaft 16. At this point, the internal combustion engine 5 is controlled so as to follow an optimum fuel consumption curve giving low consumption, low exhaust gas amount, and a high engine combustion efficiency.

On the other hand, the output from the rotor 19 of the second electric motor (motor for drive) $10_1$ is transmitted to the transmission $30_1$ via the sleeve (intermediate) shaft 31. Then the speed is changed to two deceleration speed steps by the transmission $30_1$, and the output is transmitted to the output shaft 16. The power from the second electric motor $10_1$, the speed of which is changed via the transmission $30_1$, is assisted by the power from the internal combustion engine 5 and distributed to the output shaft 16 via the power distribution planetary gear 9. Then, the power of the output shaft 16 is transmitted via the flexible connecting 20, the propeller shaft 21, and the differential device 22 to the left and right drive shafts $23l$, $23r$ to drive the left and right rear wheels 25, 25.

In the transmission $30_1$, the output from the second motor $10_1$ is transmitted to the first sun gear S2 via the sleeve shaft 31. In a low state, the second brake B2 is engaged and the first brake B1 is released, so that the carrier CR2 is in a fixed state and the second sun gear S3 is in a free rotation state. The rotation speed of the first sun gear S2 is reduced to a large degree via the pinions P2, P3, then transmitted to the ring gear R2, and then the rotation of the ring gear R2 is transmitted to the output shaft 16.

Conversely, in a high state of the transmission $30_1$, the first brake B1 is engaged and the second brake B2 is in a released state, so that the second sun gear S3 is in a fixed state. In this state, the rotation of the first sun gear S2 is transmitted to the short pinion P3 and the long pinion P2 is meshed with the second sun gear S3 in a stop state, and while the carrier CR2 is revolving at a regulated and predetermined rotation, the rotation based on a small reduction gear ratio is transmitted to the ring gear R2. The rotation of the ring gear R2, decelerated to a relatively small degree, is transmitted to the output shaft 16.

In an electric motor, such as a DC shunt motor used in the hybrid drive system, particularly in a brushless DC motor, the torque decreases as the number of revolutions increases. However, even when the number of revolutions is equal to or lower than a predetermined value, the torque does not increase but remains constant at the maximum torque value. In other words, the output characteristics, such as the maximum torque and the maximum rotational speed, are determined by a size of the electric motor, such as total magnetic fluxes and the number of windings. Further, the limit of the output with respect to the number of revolutions is determined by the output of the battery, the output of electric generation of the first motor 7, and the thermal performance.

On the other hand, the power distribution planetary gear 9, controlled by the first motor 7, is usually set so as to correspond to a relatively high gear ratio (to correspond to overdrive), and is controlled such that the driving force (torque) output from the internal combustion engine 5 to the output shaft 16 remains substantially constant. Accordingly, when a large driving force (torque) is required, such as when the vehicle is started or the like, the major part of the required driving force mainly depends on the second motor (motor for drive) $10_1$.

Then, as described above, the output of the second motor $10_1$ is switched to two speed steps of different reduction gear ratios by means of the transmission $30_1$, and then is output to the output shaft 16 as described above. Accordingly, when a large driving force is required at the time of starting or the like, the transmission $30_1$ is in the low state and the second motor $10_1$ is decelerated in a large degree for transmission to the output shaft 16. Thus, the output shaft 16 is assisted with a torque (driving force) equal to or larger than the maximum torque value. Further, during a constant speed running state, such as in a high-speed running, the transmission $30_1$ is switched to a high state such that the (maximum) number of revolutions of the second electric motor $10_1$ corresponds to the (maximum) vehicle speed. Consequently, a driving force and a vehicle speed required for a vehicle can be secured while keeping the output of the internal combustion engine 5 at an appropriate output following the optimum fuel consumption curve or the like, without increasing the size of the second motor $10_1$.

Figure 5:
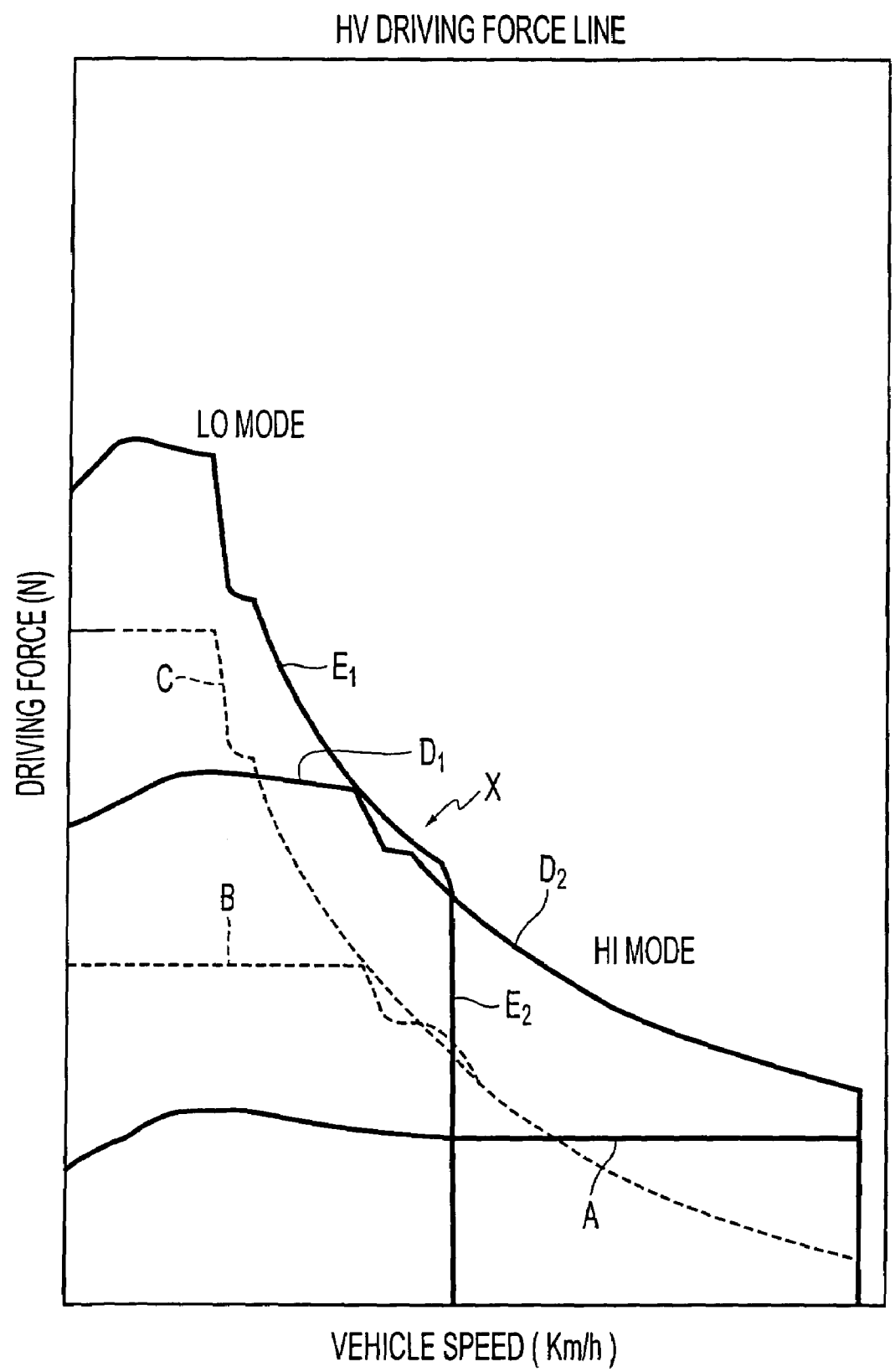
FIG. 5 is a graph of a hybrid driving force line according to the invention, in which fluctuations of a drive force are plotted with respect to a vehicle speed.

More specific descriptions will be provided with reference to FIG. 5. FIG. 5 is a driving force graph plotting vehicle speeds versus variations in driving force transmitted from the internal combustion engine 5 to the output shaft 16, and driving force transmitted to the output shaft 16 by the second electric motor $10_1$ when the transmission $30_1$ is in the low state or the high state (the driving force multiplied by the radius of the driving wheel is equal to the torque; driving force and torque are substantially the same in meaning). The first electric motor 7 controlling the internal combustion engine 5 and gear ratios of the power distribution planetary gear 9 are controlled such that line A of maximum driving forces transmitted from the internal combustion engine to the output shaft becomes approximately constant with respect to each vehicle speed (varied in a low speed range). Line B shows the maximum driving force which is output to the output shaft 16 by the second electric motor $10_1$ when the transmission $30_1$ is in a high state. Similarly, line C shows the maximum driving force of the second electric motor $10_1$ when it is in a low state. The resultant of the electric motor driving force line B in the high state and the internal combustion engine driving force line A is a high state driving force D ($D_1$, $D_2$). The resultant of the electric motor driving force line C in the low state and the internal combustion engine driving force line a is a low state driving force line E ($E_1$, $E_2$).

As is clear from FIG. 5, the internal combustion engine 5 and the first electric motor 7 are controlled such that the engine driving force line A shows the appropriate output characteristics and the engine output follows the optimum fuel consumption curve or the like. In the low speed range, the transmission $30_1$ is set in the low state with the low state driving force line $E_1$. Additionally, in the high speed range, the transmission $30_1$, is switched to the high state in the vicinity of X to follow the high state driving force line $D_2$. Note that the low speed range $D_1$ of the high state driving force line and the high speed range $E_2$ of the low state driving force line are not used in usual operation. Therefore, in the low speed range, the low state driving force line $E_1$ is the maximum driving force line for the output shaft 16 of the hybrid drive system $6_1$. The first speed, the second speed and the third speed in a conventional automatic transmission (AT) are substantially included within that range, for example. In addition, the low state is smoothly switched to the high state in the vicinity of X. Then, in the high speed range, the high state driving force line $D_2$ is the maximum driving force line, for example, the fourth speed, the fifth speed and the sixth speed of the automatic transmission are included within the range.

In other words, as compared with the one in which all shift speeds of the automatic transmission are provided by means of an electric motor alone, the use of the transmission $30_1$ makes it possible to reduce the size of the second electric motor $10_1$.

Here, the transmission $30_1$ is provided only for changing the speed of the output from the second electric motor $10_1$, and has no influence on the control of the internal combustion engine 5 and the power distribution planetary gear 9. Accordingly, the internal combustion engine 5 and the power distribution planetary gear 9 can be controlled sufficiently in a way similar to that for a conventional hybrid vehicle not using the transmission $30_1$ (a large-sized second motor is required, however). In other words, as shown in FIG. 6(a), the number of revolutions of the output shaft 16 is uniquely defined by a number of revolutions $N_M$ of the first electric motor (motor for control) 7 and a number of revolutions $N_E$ of the engine 5. This is the same in a conventional hybrid vehicle and in the hybrid vehicle according to the invention.

Note that it may also be possible that the rotor 19 of the second motor $10_1$ is connected with the output shaft 16 and the transmission is arranged at a downstream side of the output shaft in order to change the entire speed. In this case, as shown in FIG. 6(b), suppose for example that the transmission is in the high state and the setting is made such that the engine executes the output so as to follow the optimum fuel consumption curve. In this case, if the transmission in the downstream side of the output shaft is switched to the low state, a transmission input number of revolutions $N_1$ increases from $N_1 1$ to $N_1 2$. At this time, it is difficult to instantly perform follow-up control on the number of revolutions of the first electric motor 7. Thus, the number of revolutions $N_E$ of the engine increases from $N_E 1$ to $N_E 2$ and, as a result, deviates from the optimum fuel consumption curve. Further, in order to restore the the number of revolutions of the engine $N_E$ to the optimum fuel consumption curve $N_E 1$, a complicated control is required in which the number of revolutions $N_M$ of the first electric motor 7 is decreased from $N_M 1$ to $N_M 2$.

Next, other embodiments in which the transmission is partially modified will be described with reference to FIGS. 2 to 4. Note that in these other embodiments, the components, except the transmission, are the same as those in the foregoing (first) embodiment. Thus, the same reference numerals are provided and the descriptions are omitted.

Figure 2:
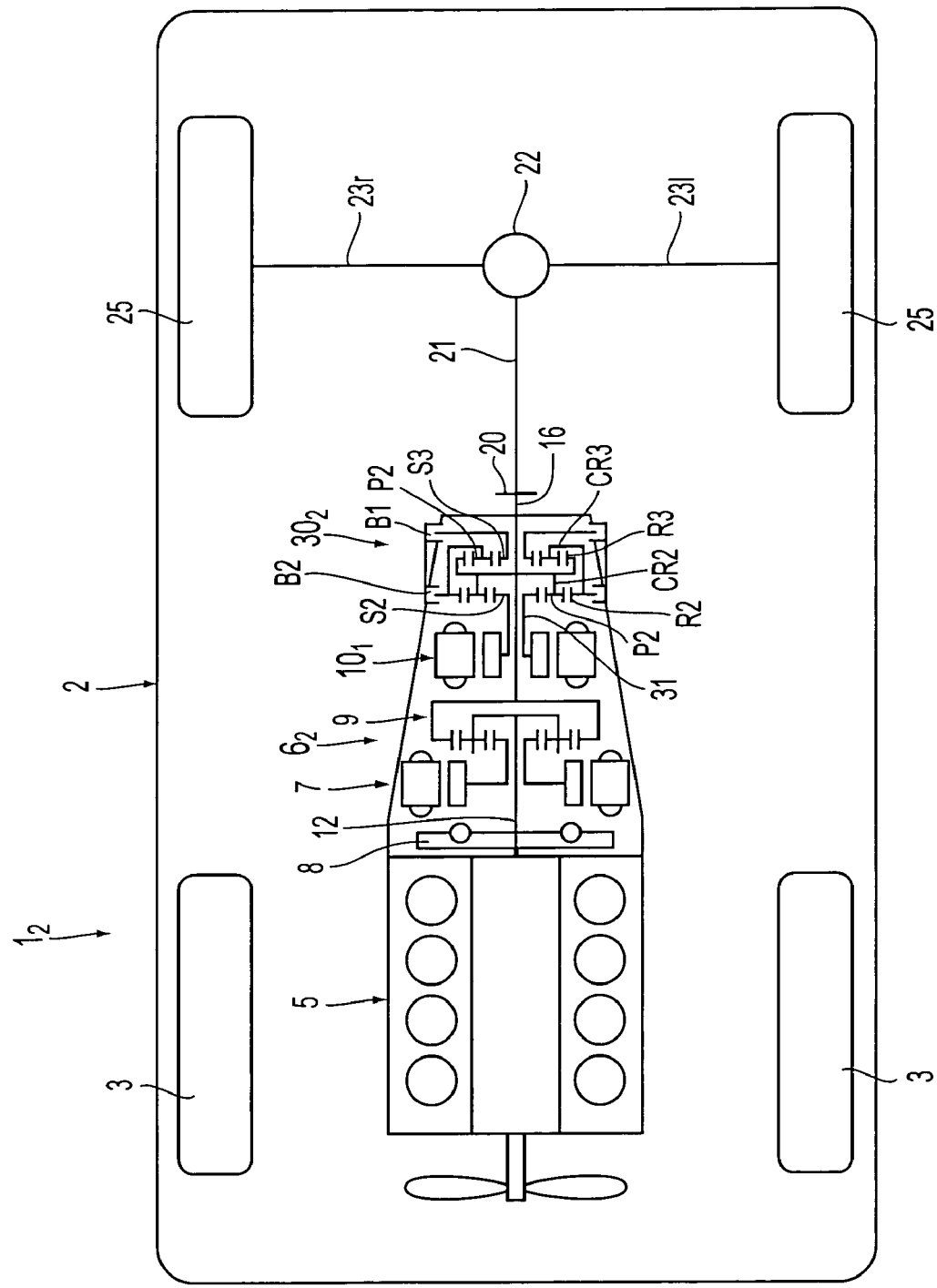
FIG. 2 is a plan view showing a second embodiment of the invention.

A transmission $30_2$ of a hybrid drive system $6_2$ (a second embodiment), shown in FIG. 2, includes two simple planetary gears in which the carriers and ring gears are connected each other. A first sun gear S2 is connected with a sleeve shaft 31 which serves as an input shaft of the transmission. A first carrier CR2 and a second ring gear R3, which are connected with each other, are connected with the output shaft 16. Further, a first ring gear R2 and a second carrier CR3, which are connected with each other, are connected with a second brake B2. A second sun gear S3 is connected with a first brake B1.

The transmission $30_2$ is provided for executing a two-step speed change with different reduction gear ratios. In a low state, the second brake B2 is engaged and the first brake B1 is in a released state. In this state, the output of the second electric motor (motor for drive) $10_1$ is transmitted to the first sun gear S2 via the sleeve shaft 31. Then, based on a state where the ring gear R2 is in a stop state by means of the second brake B2, the first carrier CR2 decelerates the rotation, and then the rotation, which has been reduced in speed in a large degree, is transmitted to the output shaft 16. Note that the rotation of the first carrier CR2 is transmitted to the second ring gear R3 only to make an idle rotation of the sun gear S3 via the pinion P2 of the second carrier CR3, which is in a stop state. Thus, it is not involved in the transmission.

In a high state, the first brake B1 is engaged and the second brake B2 is released. In this state, the second sun gear S3 is in a stop state and the rotation of the first sun gear S2 from the second electric motor $10_1$ is transmitted, via the first carrier CR2 and the first ring gear R2, to the second ring gear R3 and the second carrier CR3, respectively. Then, because the second sun gear S3 is in the stop state, the second ring gear R3 and the first carrier CR2, which are integrally connected, decelerate the rotation, and the decelerated rotation is transmitted to the output shaft 16.

Figure 3:
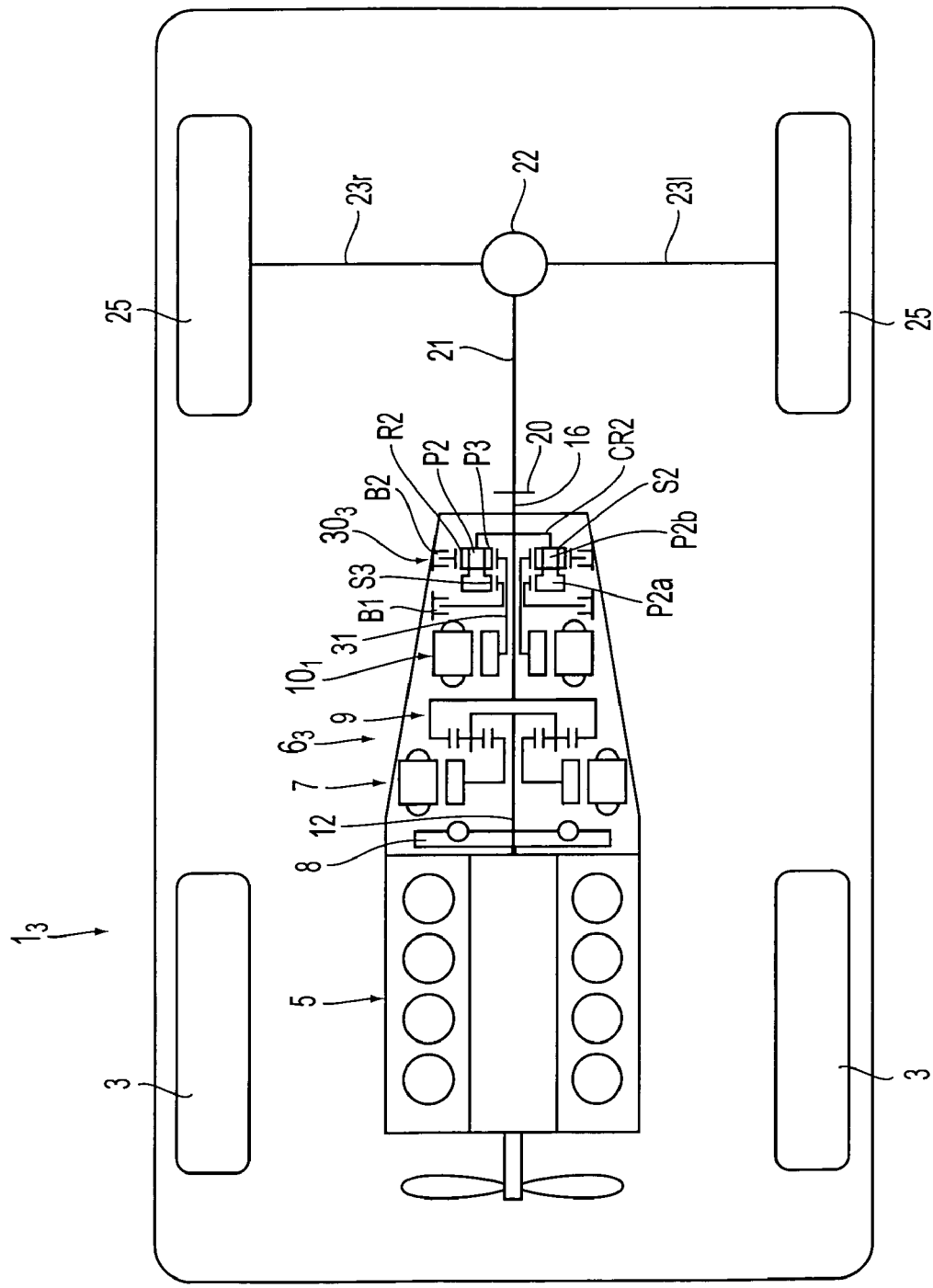
FIG. 3 is a plan view showing a third embodiment of the invention.

FIG. 3 is a diagram illustrating a third embodiment. A transmission $30_3$ of a hybrid drive system $6_3$ is of a Ravigneaux type as in the case of the first embodiment (FIG. 1). The transmission $30_3$ has a long pinion P2 shaped in a stepped manner with different numbers of teeth. A large-diameter gear forms a portion P2a meshed with a second sun gear S3, and a small-diameter gear forms a portion P2b meshed with a short pinion P3. Further, in the first embodiment, the carrier CR2 is connected with the second brake B2 and the ring gear R2 is connected with the output shaft 16. In this third embodiment, in the transmission $30_3$ the ring gear R2 is connected with a second brake B2, and the carrier CR2 is connected with the output shaft 16.

The transmission $30_3$ is provided for executing a two-step speed change with different reduction gear ratios. In the low state, the second brake B2 is engaged and the first brake B1 is in a released state. In this state, for an output transmitted from the second electric motor (motor for drive) $10_1$ via the sleeve shaft 31 to the first sun gear S2, the decelerated rotation is transmitted to the carrier CR2 via the short pinion P3 based on the ring gear R2 being stopped by the second brake B2. Thus, the rotation, decelerated to a large degree, is transmitted to the output shaft 16.

In the high state, the first brake B1 is engaged and the second brake B2 is released. In this state, the rotation of the first sun gear S2 is transmitted to the short pinion P3, and the long pinion P2 is meshed with the second sun gear S3 in a stop state. Thus, the carrier CR2 decelerates the rotation, and the decelerated rotation, decelerated to a smaller degree (i.e., to a lesser degree than the low stage), is transmitted to the output shaft 16.

Note that the number of teeth of each portion P2a, P2b of the step-shaped long pinion P2 is a design matter defined by a required reduction gear, and therefore a long pinion without a step may be used.

Figure 4:
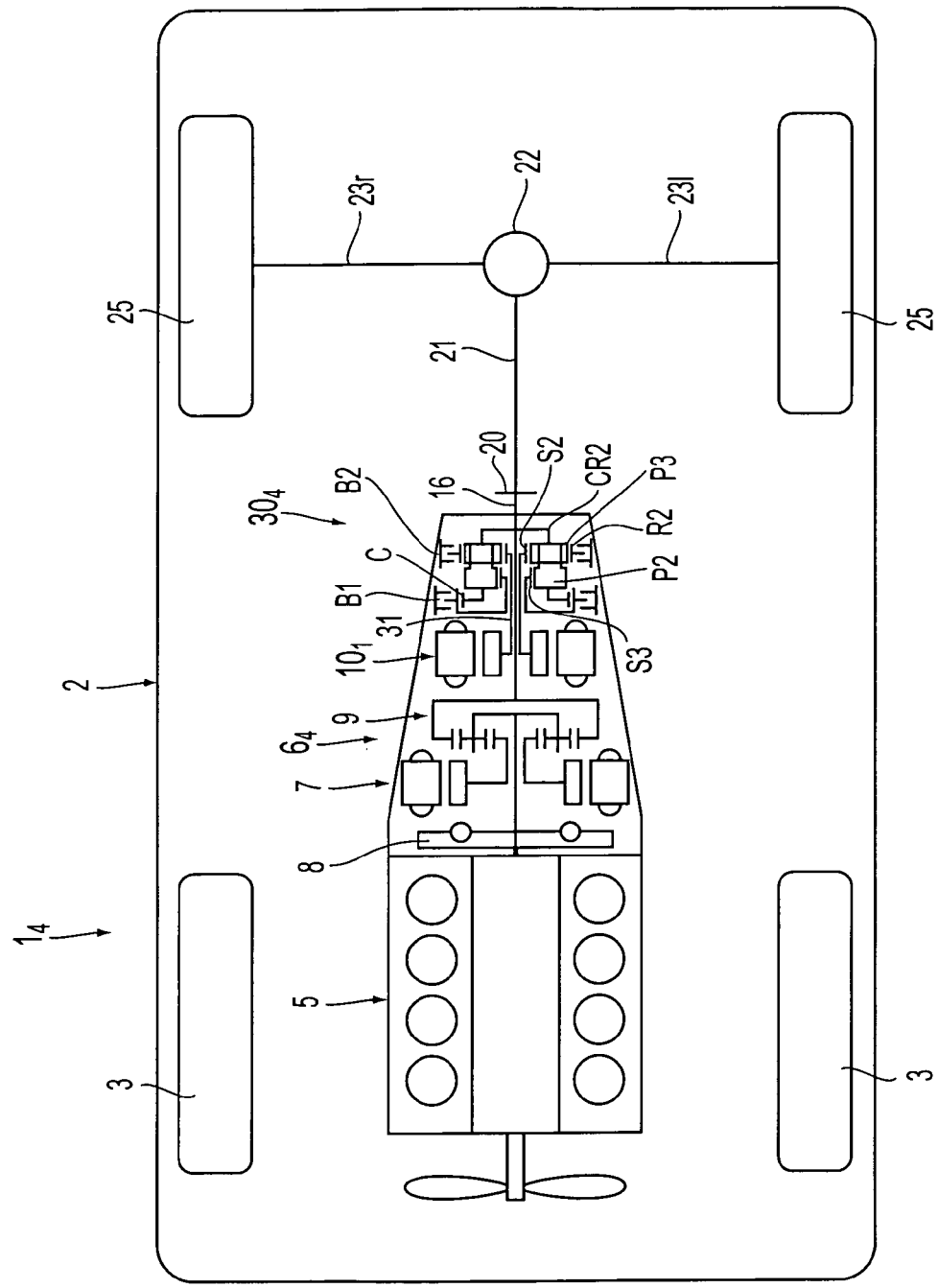
FIG. 4 is a plan view showing a fourth embodiment of the invention.

FIG. 4 is a diagram illustrating a fourth embodiment. A transmission $30_4$ of the hybrid drive system $6_4$ uses a Ravigneaux-type planetary gear similar to that in the transmission $30_3$ (see FIG. 3) of the third embodiment described above. However, they are different in that a clutch is interposed between the second sun gear S3 and the carrier CR2.

As in the case of the aforementioned transmission $30_3$ (FIG. 3), the transmission $30_4$ engages the second brake B2 and releases the first brake B1 to achieve a low (Lo) state based on a large reduction gear ratio. In addition, a high (Hi) state, based on a small reduction gear ratio, is achieved by engaging the first brake B1 and releasing the second brake B2. Note that the clutch C is released in the low state and in the high state.

To the transmission $30_4$, a directly connected state is additionally applied to provide a reduction gear ratio for a third speed step. In the directly connected state, both second and first brakes B2, B1 are released, and the clutch C is engaged. In this state, the second sun gear S3 and the carrier CR2 are connected, thereby preventing the rotation of the pinions P2, P3 on their axes. Accordingly, the rotation from the second electric motor $10_1$ to the first sun gear S2 is transmitted to the carrier CR2 as it is and, thus, the combined (directly connected) rotation is transmitted to the output shaft 16.

Figure 7:
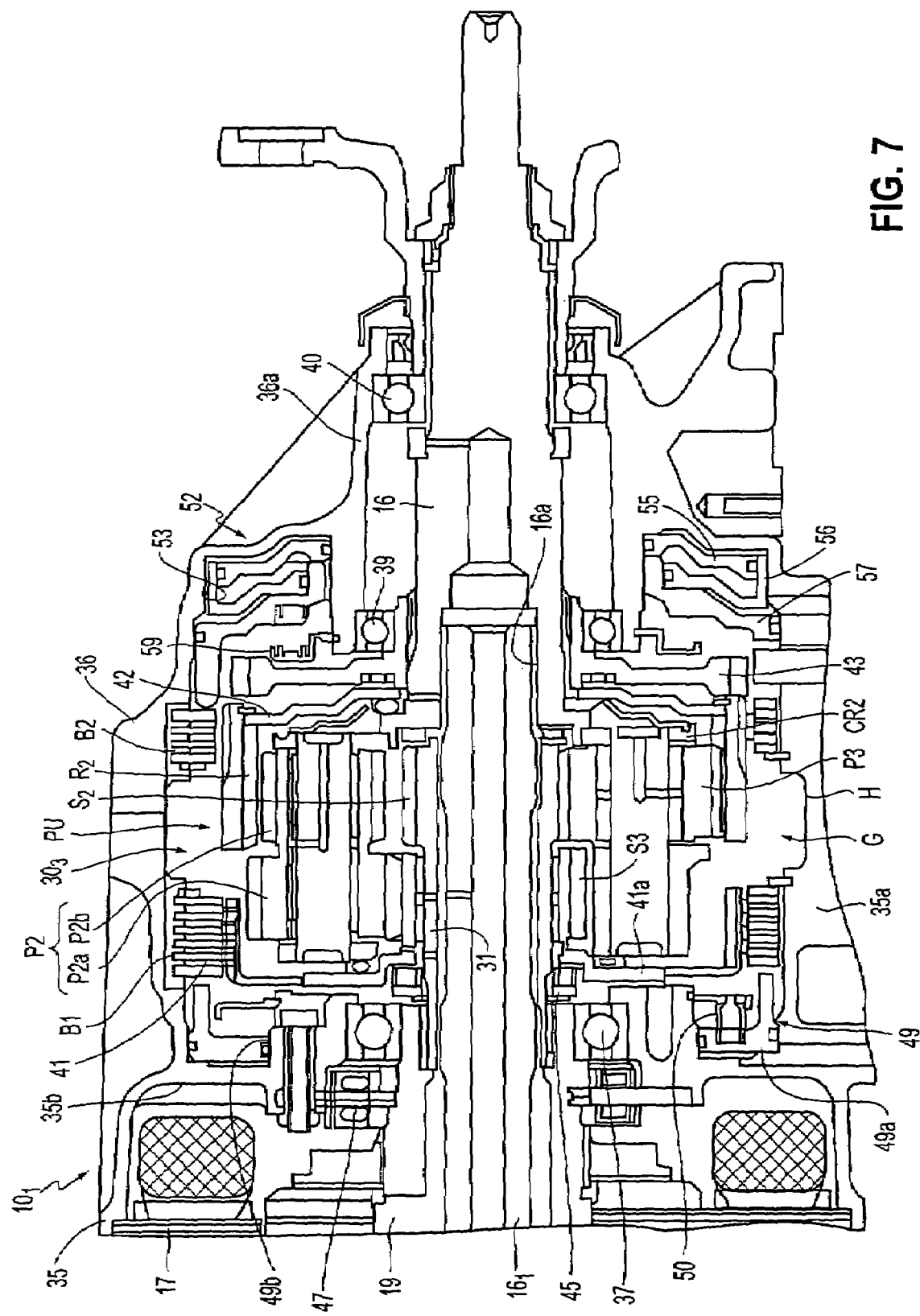
FIG. 7 is a sectional view specifically showing the transmission according to the third embodiment.

FIG. 7 is a sectional view specifically illustrating the transmission $30_3$ according to the third embodiment described above in FIG. 3. The transmission $30_3$ is provided with a so-called Ravigneaux-type planetary gear unit PU which includes a single dual planetary gear (S2, R2, CR2) and a planetary gear having a sun gear S3 and the common carrier CR2 having a long pinion P2 common with the planetary gear. Also, the long pinion P2 is shaped in a stepped manner with different number of teeth. In other words, the dual planetary gear above includes the first sun gear S2, the first ring gear R2 and the common carrier CR2 supporting the short pinion P3 and the long pinion P2, in which the short pinion P3 meshes with the sun gear S2 and the ring gear R2, and the small-diameter gear P2b of the long pinion P2 meshes with the short pinion P3 above. The large-diameter gear P2a of the long pinion P2 above meshes with the second sun gear S3.

The first sun gear S2 is integrally formed with the sleeve shaft (intermediate shaft) 31 which is connected with the rotor 19 of the second electric motor $10_1$ by means of a spline. The second sun gear S3 is rotatably supported on the intermediate shaft 31 via a bush or the like. The common carrier CR2 is integrally fixed to the output shaft 16 on its backside plate. The output shaft has a hollow portion 16a on the front end side. A connecting output shaft $16_1$ extending from the ring gear R1 (not shown in FIG. 7) of the power distribution planetary gear 9 is spline-engaged with the hollow portion 16a.

The transmission $30_3$ above is housed in a case space G provided by joining a rear portion 35a of the case 35 for housing the second electric motor $10_1$, and an extension housing 36. The motor case 35 has a partition wall 35b on which a back end portion of the rotor 19 is rotatably supported via a ball bearing 37 (and a front end portion thereof is supported in a same manner). In the bearing portion, the connecting output shaft $16_1$ is supported via the rotor 19, the sleeve shaft 31 and the bush. The output shaft 16 is rotatably supported by a boss portion 36a of the above extension housing 36 via two ball bearings 39, 40 provided at a predetermined interval.

The first brake B1, including many sheets of discs and friction plates (brake plates), is interposed between the outer circumferential face of a hub 41, which extends from the front end portion of the second sun gear S3 and passes the front end side of the carrier CR2 in an outer radial direction, and the inner circumferential spline of the rear portion 35a of the motor case. Further, in a similar way, the second brake B2, including a wet-type multiple disc brake, is interposed between the outer circumferential face of the ring gear R2 and the inner circumferential face spline of the extension housing 36. Accordingly, a joint face H between the motor case 35 and the extension housing 36 is arranged between the first brake B1 and the second brake B2. Further, the first brake B1, positioned at the second electric motor 101 side (the front side) has a large number of discs and friction plates as compared with the second brake B2 positioned in the rear side, so as to achieve a large torque capacity from a small pressing force.

Further, the common carrier CR2 is arranged between a connecting disc 41a, of the hub 41 for the first brake B1, and a support disc 42 of the ring gear R2. Further, a parking mechanism with detector 43 for detecting the output number of revolutions is arranged by being supported by the ball bearing 39. Between the parking mechanism with detector 43 and a ring 45, supported by clamping by means of a snap ring on the sleeve shaft 31, the aforementioned Ravigneaux-type planetary gear unit PU is arranged by being positioned in the axial direction via many thrust bearings. In addition, the second and first brakes B2, B1 are arranged so as to surround the outer radial side of the planetary gear unit, and the transmission $30_3$ is housed in the space G above. In this case, the first brake B1 is arranged at the outer radial side of the second sun gear S3 and the large-diameter gear P2a of the long pinion, and overlaps them.

To the front side of the ball bearing 37, on the motor-case partition wall 35b, a resolver (rotational position detecting unit) 47 for detecting a rotational position of the rotor 19 is arranged beside the ball bearing 37 in the axial direction. On the outer radial side of the ball bearing 37 and on the case partition wall 35b, is a hydraulic actuator 49 for the first brake B1. The actuator 49 includes a ring-shaped recessed groove 49b formed in the partition wall and a piston 49a fitted into the recessed groove in an oil-tight manner. The piston 49a has a portion protruding in the axial direction which can contact with the disc of the brake B1. Furthermore, a return spring 50 is provided between the piston 49a and a retainer (unnumbered) fixed to the partition wall. Note that the actuator 49 and the ball bearing 37 are arranged so as to overlap each other in the axial direction.

A hydraulic actuator 52 for the second brake B2 is arranged in a rear part of the extension housing 36, namely, a part between the boss portion 36a and the case portion above for housing the transmission. The actuator has a recessed groove 53 formed in the housing and a double piston fitted into the recessed groove 53 in oil-tight manner. The double piston includes a first piston 55 arranged on a cylinder bottom portion formed by the bottom portion of the recessed groove 53, a reaction plate 56 having an end thereof which is in contact with the bottom portion, and a second piston 57 having the reaction plate which serves as the cylinder bottom portion and having an internal diameter portion which can contact with the first piston 55. Furthermore, a return spring 59 is provided in a contracted manner between a retainer (unnumbered), fixed to the boss portion 36a, and the second piston 57.

Therefore, the double piston has a pressure-receiving area that is the sum of the pressure-receiving area of the first piston 55 and the pressure-receiving area of the second piston 57. Thus, even if the structure is small in the radial direction, a large pressing force can act on the second brake B2. Accordingly, the second brake B2 can secure a required torque capacity because of a large pressing force from the hydraulic actuator 52 provided with the double piston structure, even if the second brake B2 has a compact structure in the axial direction and has a small number of brake plates as compared with those in the first brake B1. On the other hand, the first brake B1 can secure a required torque capacity because of its brake structure having many sheets of brake plates, even if the hydraulic actuator 49 has a compact structure and is arranged on the motor case partition wall 35b. It goes without saying that the double piston may be a single piston.

Figure 8:
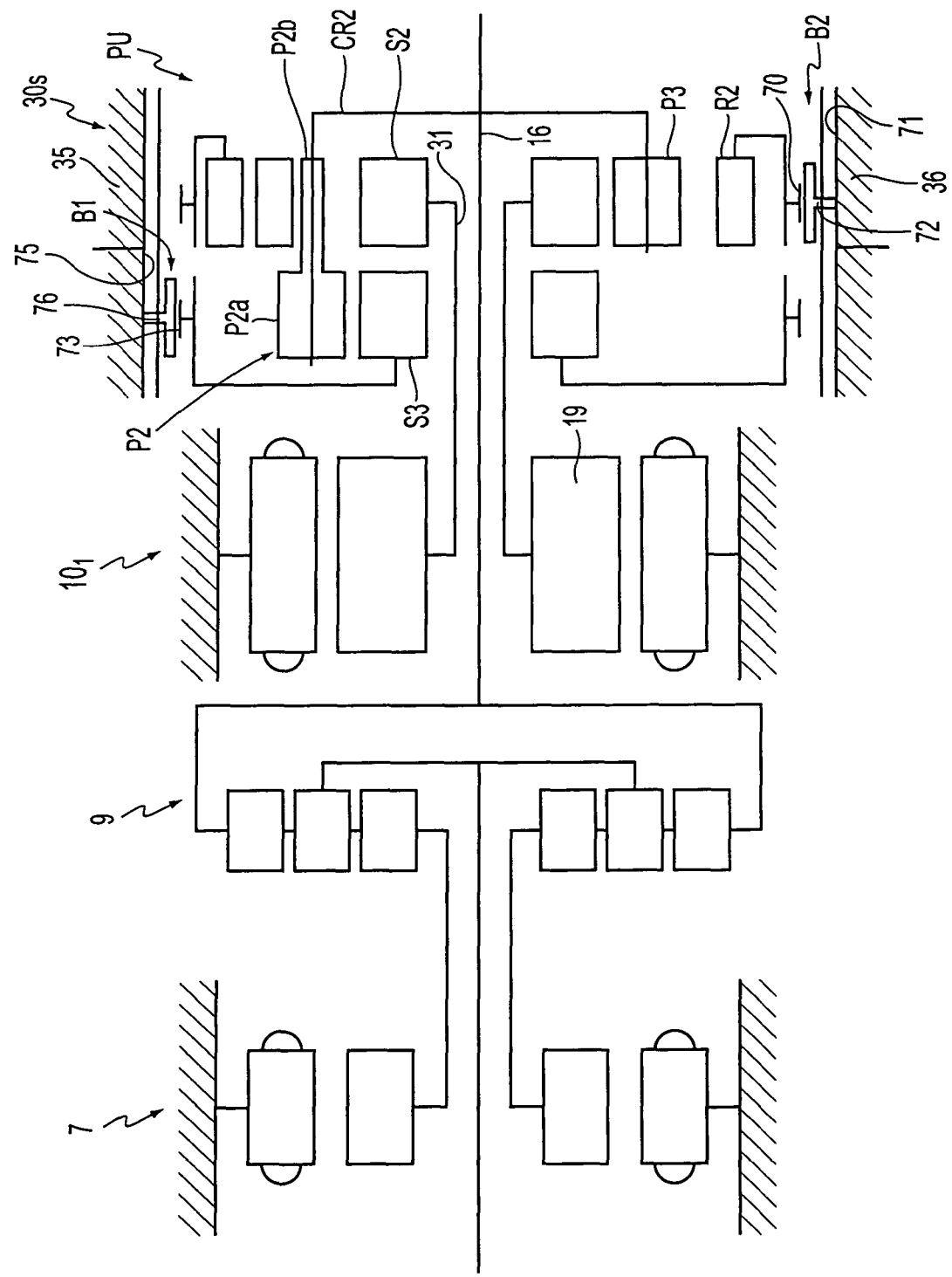
FIG. 8 is a schematic diagram showing the hybrid drive system having the transmission using an actuator other than the hydraulic actuator.

FIG. 8 is a diagram illustrating an embodiment in which the transmission is operated with the use of an actuator other than a hydraulic actuator. Note that the first electric motor 7, the power distribution planetary gear 9 and the second motor $10_1$ are the same as those in the foregoing embodiment, and the schematic diagram and the same reference numerals are used and the descriptions are omitted. A transmission $30_5$ may be of any type, however, the planetary gear unit PU as used in the third embodiment ($30_3$) is shown here as an example.

The planetary gear unit PU of a transmission $30_5$ has a common carrier CR2 supporting a long pinion P2 and a short pinion P3. The long pinion P2 has a large-diameter gear P2a and a small-diameter gear P2b. The short pinion P3 meshes with the small-diameter gear P2b, a first sun gear S2 and a first ring gear R2. The large-diameter gear P2a meshes with a second sun gear S3. The first sun gear S2 is connected via the sleeve shaft 31 with the rotor 19 of the electric motor $10_1$. The common carrier CR2 is connected with the output shaft 16. The first ring gear R2 is connected with the second brake B2, and the second sun gear S3 is connected with the first brake B1.

The second brake B2 has an outer circumferential spline 70 integrally formed on the first ring gear R2, an inner circumferential spline 71 formed in the case (extension housing) 36, and a sleeve 72 having a spline engaged with both of these splines. In the same way, the first brake B1 has an outer circumferential spline 73 formed on the hub 41 integrally formed with the second sun gear S3, an inner circumferential spline 75 formed in the case (motor case) 35, and a sleeve 76 having a spline engaged with both of these splines. Then, the sleeve 72 or 76 is shifted in the axial direction by means of an electric actuator or by hand to engage/disengage the outer circumferential spline 70 or 73, thereby constituting a so-called dog brake.

In other words, a low state where the second brake B2 is engaged and the first brake B1 is released is established in a state where the sleeve 72 is engaged with both splines 70, 72 and the sleeve 76 is off from the inner circumferential spline 73. On the other hand, a high state where the first brake B1 is engaged and the second brake B2 is released is established in a state where the sleeves 72, 76 have been shifted by means of the electric actuator or the like, the sleeve 72 is off from the outer circumferential spline 70, and the sleeve 76 is engaged with both splines 73, 75.

Note that the second and first brakes B2, B1 are not limited to the above dog-type brake, and a friction engagement element, such as the wet-type multiple disc brake described in the foregoing embodiment, may be used. Also in this case, the electric actuator using a ball screw mechanism and an electric motor, or another type of actuator may be used.

Note that the aforementioned transmission is not limited to those in the foregoing embodiments. It goes without saying that an automatic transmission with two, three or more speed steps or an automatic transmission having an acceleration speed step (O/D) may be used. Moreover, a continuous variable transmission (CVT) may be used. Furthermore, the output of the transmission is not limited to the output shaft 16, and may be connected with any portion of the power train from the output shaft 16 to the drive wheels 25, 25.

Additionally, the aforementioned embodiments have described the hybrid drive system incorporated in a vehicle of the FR (front engine, rear drive) type. However, it goes without saying that the hybrid drive system is not limited to this application and can be used for an application to a vehicle of the FF (front engine, front drive) type.

What is claimed is:

1. A hybrid drive system which transmits output from an internal combustion engine to an output portion and inputs output from a second electric motor to the output portion, the hybrid drive system comprising:
    a first electric motor;
    a power distribution planetary gear, the power distribution planetary gear having a first rotation element to which output from the internal combustion engine is transmitted, a second rotation element that is operatively linked with the first electric motor, and a third rotation element that is operatively linked with the output portion; and
    a plurality of speed steps transmission interposed between the second electric motor and the output portion, wherein the third rotation element is not operatively linked with the output portion via the transmission.

2. The hybrid drive system according to claim 1, wherein the transmission is an automatic transmission that includes the plurality of speed steps with different transmission paths.

3. The hybrid drive system according to claim 2, wherein the transmission is the automatic transmission which outputs a plurality of decelerated rotations produced by different reduction gear ratios.

4. The hybrid drive system according to claim 3, wherein the transmission has a planetary gear unit that is axially arranged.

5. The hybrid drive system according to claim 4, wherein the first electric motor, the power distribution planetary gear, the second electric motor and the transmission are arranged axially.

6. The hybrid drive system according to claim 4, wherein the planetary gear unit has at least four revolution elements.

7. The hybrid drive system according to claim 4, wherein the transmission has at least two friction engagement elements, and the power transmission paths of the planetary gear unit are switched by selecting an actuation of these friction engagement elements, the transmission is housed in a case, the friction engagement elements are a second brake and a first brake that are interposed between the two different elements of the planetary gear unit and the case, and the brakes are arranged in an external diameter side of the planetary gear unit in a surrounding manner.

8. The hybrid drive system according to claim 6, wherein the planetary gear unit is of a Ravigneaux type.

9. The hybrid drive system according to claim 8, wherein the case includes a motor case and an extension housing, for housing the second electric motor, the transmission is housed within a case space wherein a rear end face of the motor case and a front end face of the extension housing are joined, and one of the first and the second brakes is arranged in the motor case, and the other of the first and the second brakes is arranged in the extension housing.

10. The hybrid drive system according to claim 9, wherein an actuator for actuating one of the second brake and the first brake is arranged in a support portion of the case.

11. The hybrid drive system according to claim 10, wherein the motor case has a partition wall that serves as the support portion on which a bearing for supporting a rotor of the second electric motor is mounted, and the actuator is arranged on the partition wall as overlapping the bearing in the axial direction.

12. The hybrid drive system according to claim 10, wherein the actuator is a hydraulic actuator, the hydraulic actuator is arranged in the support portion of the extension housing and has a double piston structure, and the second brake which is actuated by the hydraulic actuator is structured so as to have a small torque capacity as compared with the first brake.

13. The hybrid drive system according to claim 11, wherein the actuator is a hydraulic actuator, the first brake is actuated by the hydraulic actuator, which is arranged on the partition wall of the motor case, and is structured to have a large torque capacity.

14. The hybrid drive system according to claim 7, wherein the planetary gear unit has a common carrier for supporting a long pinion and a short pinion, and the long pinion has a large-diameter gear and a small-diameter gear, and the short pinion is meshed with the small-diameter gear, a first sun gear, and a first ring gear, and the large-diameter gear is meshed with a second sun gear, and the first sun gear is connected with the rotor of the electric motor, and the common carrier is connected with the output portion, and the first ring gear is connected with the second brake, and the second sun gear is connected with the first brake.

15. The hybrid drive system according to claim 14, wherein the first brake is arranged at the outerradial side of the second sun gear and the large-diameter gear.

16. A vehicle, comprising an internal combustion engine; a drive wheel; and the hybrid drive system according to claim 1, wherein output from the output portion is transmitted to the drive wheel.

17. The vehicle according to claim 16, wherein the internal combustion engine is arranged such that a crank shaft thereof is oriented in a longitudinal direction of a vehicle body and is positioned in a front part of the vehicle body, and in a part behind the internal combustion engine, the first electric motor, the power distribution planetary gear, the second electric motor and the transmission are arranged axially and in the order rearward from the internal combustion engine, and the drive wheel which is operatively linked with the output portion is a rear wheel.

18. The vehicle according to claim 17, wherein the crank shaft of the internal combustion engine and the output portion are arranged on an axis, and the first electric motor, the power distribution planetary gear, the second electric motor and the transmission are arranged on the axis.

19. The hybrid drive system according to claim 1, wherein the transmission has at least two friction engagement elements, and actuators for actuating these friction engagement elements, and the hybrid drive system comprises a motor case for housing the second electric motor, and the motor case has a partition wall that serves as a support portion on which a bearing for supporting a rotor of the second electric motor, and one of the actuators is arranged on the partition wall as overlapping the bearing in the axial direction.

20. A vehicle, comprising an internal combustion engine; a drive wheel; and the hybrid drive system according to claim 19, wherein output from the output portion is transmitted to a drive wheel.

21. The hybrid drive system according to claim 19, wherein the friction engagement element has at least first and second brakes, the actuators of which are hydraulic actuators, the hydraulic actuator of the first brake, arranged on the partition wall of the motor case, is a single piston structure, the hydraulic actuator of the second brake is a double piston structure, and the number of brake plates of the second brake is less than the number of brake plates of the first brake.

22. A vehicle, comprising an internal combustion engine; a drive wheel; and the hybrid drive system according to claim 21, wherein output from the output portion is transmitted to a drive wheel.

23. The hybrid drive system according to claim 21, wherein the hybrid drive system has an extension housing, and the second brake and the hydraulic actuator of the second brake are arranged in the extension housing.

24. A vehicle, comprising an internal combustion engine; a drive wheel; and the hybrid drive system according to claim 23, wherein output from the output portion is transmitted to a drive wheel.

25. The hybrid drive system according to claim 1, wherein the transmission has a planetary gear unit, which has a carrier for supporting a long pinion and a short pinion, and a first sun gear and a ring gear that are meshed with the long pinion, and a second sun gear that is meshed with the short pinion, and the second sun gear is connected with a rotor of the second electric motor, and the ring gear is connected with the output portion, and the first sun gear is connected with a first brake, and the carrier is connected with a second brake.

26. The hybrid drive system according to claim 25, wherein the first electric motor, the power distribution planetary gear, the second electric motor and the transmission are arranged axially and in order rearward from the internal combustion engine.

27. A vehicle, comprising an internal combustion engine; a drive wheel; and the hybrid drive system according to claim 25, wherein the internal combustion engine is arranged such that a crank shaft of the internal combustion engine is oriented in a longitudinal direction of a vehicle body, in a front part of the vehicle body, and in a part behind, in the longitudinal direction, of the internal combustion engine, the first electric motor, the power distribution planetary gear, the second electric motor and the transmission are arranged axially and in order rearward from the internal combustion engine, and a drive wheel that is operatively linked with the output portion is a rear wheel.

28. The hybrid drive system according to claim 1, wherein the transmission has a planetary gear unit, which has a first sun gear, and a first carrier and a first ring gear that are connected to each other, and a second ring gear and a second carrier that are connected to each other, and a second sun gear, and the first sun gear is connected with a rotor of the second electric motor, and the first carrier and the first ring gear are connected with the output portion, and the second sun gear is connected with a first brake, and the second ring gear and the second carrier are connected with a second brake.

29. The hybrid drive system according to claim 28, wherein the first electric motor, the power distribution planetary gear, the second electric motor and the transmission are arranged axially and in order rearward from the internal combustion engine.

30. A vehicle, comprising an internal combustion engine; a drive wheel; and the hybrid drive system according to claim 28, wherein the internal combustion engine is arranged such that a crank shaft of the internal combustion engine is oriented in a longitudinal direction of a vehicle body, in a front part of the vehicle body, and in a part behind, in the longitudinal direction, the internal combustion engine, the first electric motor, the power distribution planetary gear, the second electric motor and the transmission are arranged axially and in order rearward from the internal combustion engine, and a drive wheel that is operatively linked with the output portion is a rear wheel.

31. The hybrid drive system according to claim 1, wherein the transmission has a planetary gear unit, which has a carrier for supporting a long pinion and a short pinion, and a first sun gear and a ring gear that are meshed with the short pinion, and a second sun gear that is meshed with a first gear, the long pinion has the first gear and a second gear, and the short pinion is meshed with the second gear, and the sun gear is connected with a rotor of the second motor, and the carrier is connected with the output portion, and the second sun gear is connected with a first brake, and the ring gear is connected with a second brake, and the second sun gear and the carrier is connected through a clutch.

32. The hybrid drive system according to claim 31, wherein the first electric motor, the power distribution planetary gear, the second electric motor and the transmission are arranged axially and in order rearward from the internal combustion engine.

33. A vehicle, comprising an internal combustion engine; a drive wheel; and the hybrid drive system according to claim 31, wherein the internal combustion engine is arranged such that a crank shaft of the internal combustion engine is oriented in a longitudinal direction of a vehicle body, in a front part of the vehicle body, and in a part behind, in the longitudinal direction, of the internal combustion engine, the first electric motor, the power distribution planetary gear, the second electric motor and the transmission are arranged axially and in order rearward from the internal combustion engine, and a drive wheel that is operatively linked with the output portion is a rear wheel.

34. A vehicle, comprising:
an internal combustion engine;
a drive wheel; and
a hybrid drive system, wherein the hybrid drive system has a first electric motor, a power distribution planetary gear, a second electric motor and a plurality of speed steps transmission, and output of the second electric motor is input to the output portion, a drive power from the second electric motor is adjusted through the plurality of speed steps transmission, and a drive power of the internal combustion engine, which is distributed through the power distribution planetary gear, is outputted to the output portion but not via the transmission.

35. The vehicle according to claim 34, wherein the internal combustion engine is arranged such that a crank shaft thereof is oriented in a longitudinal direction of a vehicle body, in a front part of the vehicle body, and in a part behind the internal combustion engine, the first electric motor, the power distribution planetary gear, the second electric motor and the transmission are arranged axially and in the order rearward from the internal combustion engine, and the drive wheel is operatively linked with the output portion is a rear wheel.

36. The vehicle according to claim 35, wherein the crank shaft of the internal combustion engine and the output portion are arranged on an axis, and the first electric motor, the power distribution planetary gear, the second electric motor and the transmission are arranged on the axis.

37. A hybrid drive system which transmits output from an internal combustion engine to an output portion and inputs output from a second electric motor to the output portion, the hybrid drive system comprising:
a first electric motor;
a power distribution planetary gear, the power distribution planetary gear having a first rotation element to which output from the internal combustion engine is transmitted, a second rotation element that is operatively linked with the first electric motor, and a third rotation element that is operatively linked with the output portion; and
a transmission interposed between the second electric motor and the output portion, an output shaft of the internal combustion engine and the output portion are arranged on an axis, and the first electric motor, the power distribution planetary gear, the second electric motor and the transmission are arranged on the axis and in order rearward from the internal combustion engine, wherein the third rotation element is not operatively linked with the output portion via the transmission.

38. A vehicle, comprising:
an internal combustion engine;
a drive wheel; and
a hybrid drive system, wherein the hybrid drive system has a first electric motor, a power distribution planetary gear, a second electric motor and a transmission, and the power distribution planetary gear has a first rotation element to which output from the internal combustion engine is transmitted, a second rotation element that is operatively linked with the first electric motor, and a third rotation element that is operatively linked with an output portion, and a transmission interposed between the second electric motor and the output portion, wherein the internal combustion engine is arranged such that an output shaft thereof is oriented in a longitudinal direction of a vehicle body, in a front part of the vehicle body, and behind, in the longitudinal direction, the internal combustion engine, the first electric motor, the power distribution planetary gear, the second electric motor and the transmission are arranged axially and in order rearward from the internal combustion engine, and the drive wheel operatively linked with the output portion is a rear wheel, and wherein the third rotation element is not operatively linked with the output portion via the transmission.

39. The vehicle according to claim 38, wherein the output shaft and the output portion are arranged on an axis, and the first electric motor, the power distribution planetary gear, the second electric motor and the transmission are arranged on the axis.

40. A vehicle, comprising:
an internal combustion engine;
a drive wheel; and
a hybrid drive system, wherein the hybrid drive system has a first electric motor, a power distribution planetary gear, a second electric motor and a transmission, and the power distribution planetary gear has a first rotation element to which output from the internal combustion engine is transmitted, a second rotation element that is operatively linked with the first electric motor, and a third rotation element that is operatively linked with an output portion, and a transmission interposed between the second electric motor and the output portion, wherein in the power distribution planetary gear, output of the internal combustion engine is output to the output portion by controlling the first electric motor, and then, output of the second electric motor is input to the output portion by changing a speed to a plurality of steps in the transmission, and the output portion is operatively linked with the drive wheel, and the internal combustion engine is arranged such that an output shaft thereof is oriented in a longitudinal direction of a vehicle body, in a front part of the vehicle body, and in a part behind, in the longitudinal direction, the internal combustion engine, the first electric motor, the power distribution planetary gear, the second electric motor and the transmission are arranged axially and in order rearward from the internal combustion engine, and the drive wheel is operatively linked with the output portion is a rear wheel, and wherein the third rotation element is not operatively linked with the output portion via the transmission.

41. The vehicle according to claim 40, wherein the output shaft and the output portion are arranged on an axis, and the first electric motor, the power distribution planetary gear, the second electric motor and the transmission are arranged on the axis.

42. A hybrid drive system which transmits output from an internal combustion engine to an output portion and inputs output from a second electric motor to the output portion, the hybrid drive system comprising:

a first electric motor;

a power distribution planetary gear, wherein output of the internal combustion engine is output to the output portion by controlling the first electric motor; and a transmission interposed between the second electric motor and the output portion, wherein a crank shaft of the internal combustion engine and the output portion are arranged on an axis, the first electric motor, the power distribution planetary gear, the second electric motor and the transmission are arranged on the axis and in order rearward from the internal combustion engine, and the output of the internal combustion engine, which is distributed through the power distribution planetary gear, is outputted to the output portion but not via the transmission.

43. A hybrid drive system, comprising:

a first electric motor;

a power distribution planetary gear;

a second electric motor; and a transmission, wherein in the power distribution planetary gear, output of an internal combustion engine is output to an output portion as controlled by the first electric motor, and output of the second electric motor is input to the output portion by changing a speed to a plurality of steps in the transmission, and the output of the internal combustion engine, which is distributed through the power distribution planetary gear, is outputted to the output portion but not via the transmission.

* * * * *